United States Patent Office 3,490,057
Patented Jan. 13, 1970

3,490,057
SNOWPLOW ADAPTED TO BE CONNECTED TO A POWER DRIVEN VEHICLE
Anton Kahlbacher, Aschbachweg 8, Kitzbuhel (Tyrol), Austria
Filed June 13, 1966, Ser. No. 557,079
Int. Cl. E01h 5/00
U.S. Cl. 37—43                    4 Claims

ABSTRACT OF THE DISCLOSURE

A snowplow for removing dry and wet snow comprising two snow screws each disposed on a hollow shaft for rotation about a stationary axis. The power supplied by the vehicle is transmitted to a drive disposed on said axis, whereby each snow screw can be separately connected to said drive so that only the right or the left screw or both can be put into working position. In order to connect the snowplow to vehicles with power take-off connections at different ground clearances, the connection member is adjustable in height.

In order to regulate the ground clearance of the screws and thus the depth of the snow to be removed, sliding disks supported on the ground are provided on the sides of a deflecting blade behind the snow screws to permit lifting and lowering of the device by an elevation adjustment.

The snow screws are preferably coupled to the drive on the stationary axis through a clutch control device so that this connection can be automatically released in case of overload.

---

This invention relates to a snowplow comprising two snow-clearing screws, rotatable about an axis transverse to the direction of journey, and a deflecting blade positioned behind said snow-clearing screws, said deflecting blade being displaceably connected to a drive truck.

In known devices of the above type, centrifugal wheels, cutters and the like are mounted on a rotating shaft which cause them to rotate jointly.

The snowplow according to the invention incorporates essential improvements in that both snow-clearing screws are rotatably mounted on a stationary shaft in such manner as to enable each screw to rotate independently, each screw being able to be separately coupled with the driving mechanism.

Said driving mechanism consists of a sprocket wheel supported on the central portion of the stationary shaft, said sprocket wheel being connected by a chain to a drive which is adjustable in elevation and is driven through a power takeoff connection of the truck.

Owing to these characteristic features, the snow-clearing screw, which should be capable of being shifted rapidly from one truck onto another, can be provided with a divisible snow-clearing drum so that apart from its normal designation the device can be used as a side-milling cutter.

Both snow-clearing screws, which as already known, consist of cut and throw ridges, are supported on a stationary shaft and can be installed or removed very easily.

The snow-clearing screws may be coupled individually to a driving mechanism by a clutch which may consist of spring-loaded ball pin, this providing a guarantee of safety in case of overload.

On account of the drive, destined to be connected to the power take-off, being displaceably mounted, the snowplow according to the invention is able to be built on various types of trucks.

If only one snow-clearing screw is put in operation the other half of the space may be used for a snow-feeding device.

Figure 1:
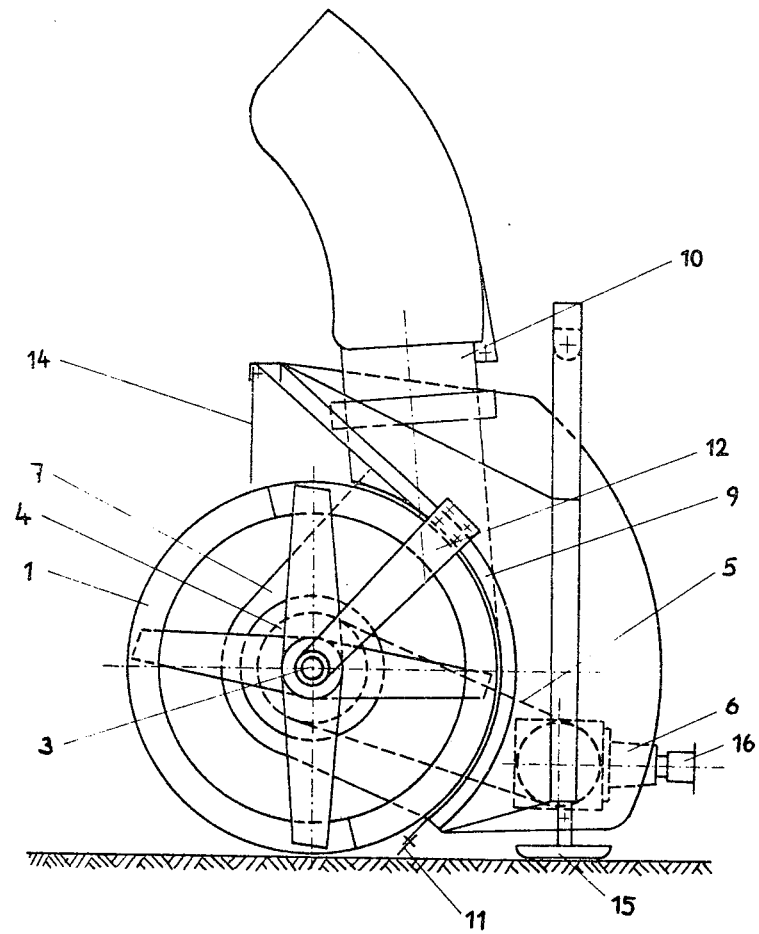
Figure 2:
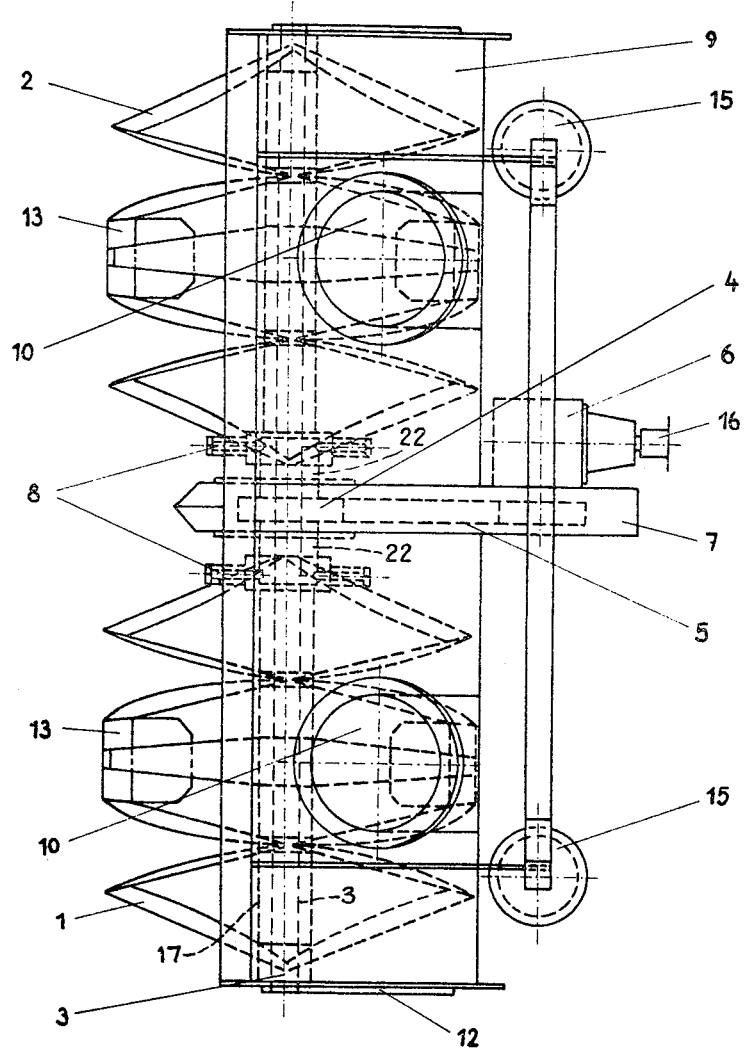
Figure 3:
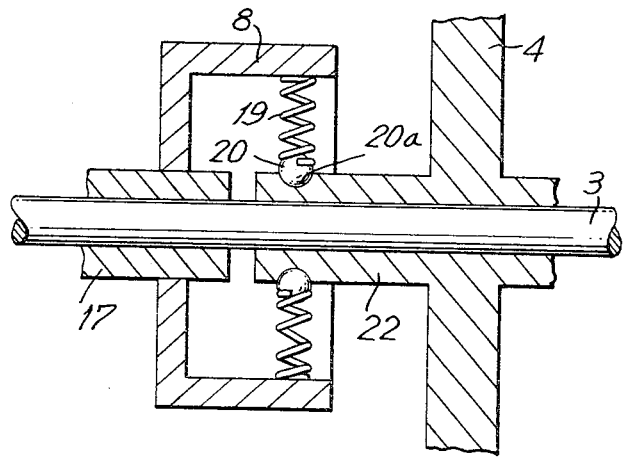
Figure 4:
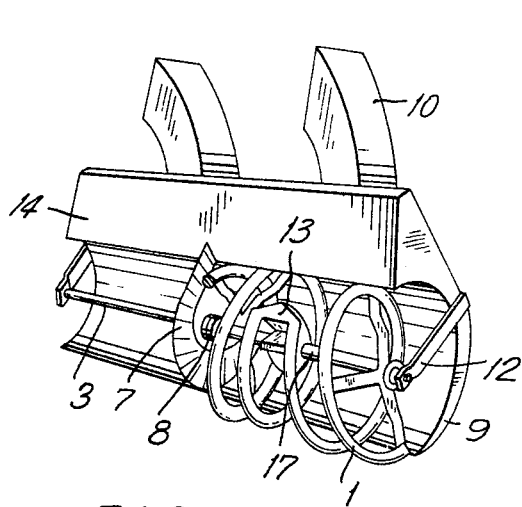
Figure 5:
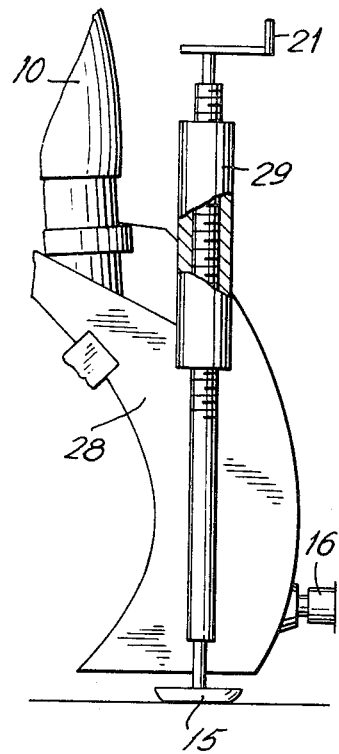

The invention will now be explained more in detail in the following description with reference to the accompanying drawing, wherein:

FIG. 1 is a partly schematic side view of the snowplow according to the invention.
FIG. 2 is a plan view of the snowplow;
FIG. 3 is a sectional view on enlarged scale of a clutch of the snowplow;
FIG. 4 is a front perspective view of the snowplow with only one screw being shown; and
FIG. 5 shows a portion of the snowplow in FIG. 1 partially broken away.

The snow-clearing drum comprises cut and throw ridges and consists of two snow-clearing screws 1, 2 rotatably mounted on a stationary shaft 3. Said screws 1, 2 are attached on said shaft 3 by means of a tube 17. Supported on the central portion of said shaft 3 is a sprocket wheel 4 the chain 5 of which is operated by a drive 6. The driving parts are lodged in a housing 7.

Each of both snow-clearing screws 1, 2 may be coupled individually with the sprocket wheel 4. The tube 17 which bears the screws 1, 2 is connected to a lug 22 on said sprocket wheel over follower spindles 8 secured to tube 17 and acting as slip clutches in the form of spring-loaded ball pins. If the device becomes overloaded, the spring 19 yields to the pressure and the ball pin 20 comes off out of its socket 20a.

Behind the snow-clearing screws 1, 2 is a deflecting blade 9 for guiding the snow. Said blade 9 is provided with openings for discharge ducts 10, the latter having rotatable throw shutters. A scraper 11 extends near the ground from the deflecting blade 9.

The stationary shaft 3 and the deflecting blade 9 are connected to one another by axle supports 12. Also the housing 7 is supported on the deflecting blade 9.

Beneath the discharge ducts 10 the helical cutting members of screws 1, 2 are connected to throw surfaces 13 which convey snow into the discharge ducts 10. The cutting members feed the throw surfaces from opposite sides thereof.

An elastic cover plate 14 is provided at the front of the deflecting blade 9 in order to catch rotating ice lumps.

Adjustment in elevation of the device is provided by sliding disks 15. In this respect the device may be raised and lowered by turning handle 21 which is connected to the spindles of disks 15, the spindles in turn being threadably engaged in casings 29 rigidly connected to the device by cross-beams 28.

The drive 6 is operative so that it may be selectively engaged with the power take-off connection 16 of the truck.

The snowplow as a whole is secured to the truck by means of supporting links or the like and is displaceable in elevation as well as being laterally swingable by suitable mechanical or hydraulic means.

It will be understood that the snowplow according to the invention may possess its own driving mechanism.

What I claim is:
1. A snowplow adapted to be connected to a power-driven vehicle, said snowplow comprising snow removal means including two screws, a supporting tube for each screw rotatable about an axis extending transverse to the direction of travel of the plow, drive means for said tubes disposed between said supporting tubes and adapted for being driven by the vehicle, means for connecting each tube selectively to said drive means whereby either or both screws can be driven in rotation about its respective axis, a deflecting blade partially encircling the screws, means connecting the screws and blade in assembled relation, said blade having a snow discharge opening adjacent each screw, a rotatable throwing plate on each screw disposed beneath a respective discharge opening for conveying snow from each screw to said opening, and an adjustable discharge duct connected to each opening and extending upwardly from the blade for the discharge of snow therefrom.

2. A plow as claimed in claim 1 wherein said means for selectively connecting each tube to the drive means comprises a connection having a clutch for releasing the connection in case of overload.

3. A plow as claimed in claim 1 comprising sliding disks adapted for being supported on the ground, said disks being coupled to said blade adjacent opposite ends thereof.

4. A plow as claimed in claim 1 comprising a connection member for joining the drive means with a power take-off connection of the vehicle, and means for adjusting the height of the connection member for adapting to the ground clearance of the power take-off connection.

References Cited

UNITED STATES PATENTS

| | | | |
|---|---|---|---|
| 2,731,739 | 1/1956 | Miller. | |
| 2,735,199 | 2/1956 | Wanner et al. | |
| 2,871,585 | 2/1959 | Merry et al. | 37—53 |
| 3,023,871 | 3/1962 | Verhoeff | 192—150 |
| 3,043,028 | 7/1962 | Merry et al. | |
| 3,194,371 | 7/1965 | Rabinow | 192—150 |
| 3,235,050 | 2/1966 | Schoppe et al | 192—150 |
| 3,319,753 | 4/1967 | Orwin et al. | 192—150 |

FOREIGN PATENTS 517,479 10/1955 Canada.

ROBERT E. PULFREY, Primary Examiner

E. H. EICKHOLT, Assistant Examiner